(12) United States Patent
Delgado et al.

(10) Patent No.: US 10,781,774 B2
(45) Date of Patent: Sep. 22, 2020

(54) TWIST-INTERLOCKING ENGINE HOUSING AND AIR FILTER AND METHOD

(71) Applicant: Injen Technology, Inc., Pomona, CA (US)

(72) Inventors: Ron Delgado, Pomona, CA (US); Jay Crouch, Pomona, CA (US)

(73) Assignee: INJEN TECHNOLOGY, INC., Pomona, CA (US)

(*) Notice: Subject to any disclaimer, the term of this patent is extended or adjusted under 35 U.S.C. 154(b) by 653 days.

(21) Appl. No.: 15/620,612

(22) Filed: Jun. 12, 2017

(65) Prior Publication Data

US 2017/0356400 A1 Dec. 14, 2017

Related U.S. Application Data

(60) Provisional application No. 62/348,253, filed on Jun. 10, 2016, provisional application No. 62/368,602, filed on Jul. 29, 2016.

(51) Int. Cl.
*F02M 35/024* (2006.01)
*B01D 46/00* (2006.01)
*B01D 46/24* (2006.01)

(52) U.S. Cl.
CPC ..... *F02M 35/02416* (2013.01); *B01D 46/001* (2013.01); *B01D 46/0005* (2013.01); *B01D 46/2411* (2013.01); *F02M 35/02483* (2013.01); *B01D 2265/02* (2013.01); *B01D 2265/022* (2013.01); *B01D 2279/60* (2013.01)

(58) Field of Classification Search
None
See application file for complete search history.

(56) References Cited

U.S. PATENT DOCUMENTS

| | | | | |
|---|---|---|---|---|
| 5,222,488 A | * | 6/1993 | Forsgren | A62B 19/00 128/201.25 |
| 5,803,939 A | * | 9/1998 | Huning | B01D 46/002 55/369 |
| 6,096,207 A | * | 8/2000 | Hoffman, Jr. | B01D 29/21 210/232 |
| 6,099,606 A | * | 8/2000 | Miller | F02M 35/024 55/330 |
| 6,319,297 B1 | * | 11/2001 | Fosnight | B01D 46/008 141/98 |
| 6,837,920 B2 | * | 1/2005 | Gieseke | B01D 46/0004 55/482 |
| 6,843,377 B1 | * | 1/2005 | Roll | B01D 29/21 210/437 |

(Continued)

*Primary Examiner* — Christopher P Jones
*Assistant Examiner* — Brit E. Anbacht
(74) *Attorney, Agent, or Firm* — Stews & Associates, P.C.

(57) ABSTRACT

A Twist-interlocking Engine Housing and Air Filter System and Method is disclosed. The filter assembly provides unequaled ease of installation and removal, as well as superior sealing between the housing and the filter assembly. For installation, the user needs only to insert the filter into the housing and then give the filter assembly a one-quarter turn or less to lock the filter assembly into the housing. There are features within the filter base that snap-locks the filter in place to resist inadvertent loosening. Finally, the housing and filter are designed so that the outer flange of the filter base is recessed into the side of the housing in order to prevent the intrusion of unwanted grime and/or fluids.

17 Claims, 11 Drawing Sheets

(56) References Cited

U.S. PATENT DOCUMENTS

| | | | |
|---|---|---|---|
| 7,122,120 B2* | 10/2006 | Diel | B01D 29/15 210/232 |
| 9,555,347 B2* | 1/2017 | Tucker | B01D 29/111 |
| 9,920,719 B2* | 3/2018 | Waltenberg | B01D 46/2411 |
| 10,413,855 B2* | 9/2019 | Nelson | B01D 46/0023 |
| 2003/0089654 A1* | 5/2003 | Jainek | B01D 29/21 210/232 |
| 2004/0011724 A1* | 1/2004 | Engelhard | B01D 29/114 210/323.2 |
| 2004/0232064 A1* | 11/2004 | Wilkinson | B01D 29/15 210/435 |
| 2005/0178716 A1* | 8/2005 | Suri | B01D 29/21 210/437 |
| 2005/0205484 A1* | 9/2005 | Diel | B01D 29/15 210/323.1 |
| 2005/0235620 A1* | 10/2005 | Connor | B01D 46/0005 55/498 |
| 2008/0142425 A1* | 6/2008 | Hansen | B01D 46/0043 210/232 |
| 2008/0245719 A1* | 10/2008 | Beard | B01D 29/114 210/235 |
| 2009/0107340 A1* | 4/2009 | Niakan | B01D 46/0036 96/135 |
| 2010/0101195 A1* | 4/2010 | Clements | B01D 46/0021 55/341.5 |
| 2010/0224065 A1* | 9/2010 | Clarke | B01D 46/0024 95/282 |
| 2012/0159915 A1* | 6/2012 | Heckel | B01D 29/111 55/510 |
| 2013/0037474 A1* | 2/2013 | Kosak | C02F 1/325 210/232 |
| 2013/0055693 A1* | 3/2013 | Clarke | B01D 46/008 55/422 |
| 2013/0193054 A1* | 8/2013 | Beard | B01D 29/21 210/232 |
| 2013/0228499 A1* | 9/2013 | Robinson | B01D 37/025 210/167.1 |
| 2014/0124430 A1* | 5/2014 | Herges | B01D 29/15 210/323.2 |
| 2014/0215982 A1* | 8/2014 | Wood | B01D 46/2411 55/502 |
| 2016/0288042 A1* | 10/2016 | Billiet | B01D 53/0415 |
| 2018/0245548 A1* | 8/2018 | Varghese | B01D 46/0002 |

* cited by examiner

TWIST-INTERLOCKING ENGINE HOUSING AND AIR FILTER AND METHOD

This application is filed within one year of, and claims priority to Provisional Application Ser. No. 62/348,253, filed Jun. 10, 2016, and Provisional Application Ser. No. 62/368,602, filed Jul. 29, 2016.

BACKGROUND OF THE INVENTION

1. Field of the Invention

This invention relates generally to internal combustion engine accessories and, more specifically, to a Twist-interlocking Engine Housing and Air Filter System and Method.

2. Description of Related Art

Cold air intakes and after-market air intake filters are very popular accessories installed on automobile engines in order to increase horsepower at a very reasonable cost. These kits are usually very amenable to do-it-yourself installation. One issue with modern vehicles (particularly turbocharged engines) is that the engine compartment has become more and more crowded, and there is less space available for the extra piping, housing and plenums that usually make up these intake kits. One approach to overcoming these space limitations is to reduce the number of components in the cold-air intake tract. In particular, manufacturers have created "one-piece" intake systems. The one-piece name refers to the placement of the air filter within the air intake housing, as opposed to having the air filter attached to the leading end of the intake hose/pipe. This approach reduces overall piping length, while also creating a sealed system that is easier to install than prior systems.

In a one-piece system, the air filter needs to attach to the intake housing as well as to the piping interconnecting the filter/housing to the engine air intake. FIG. 1 depicts one exemplary approach to a filter for such a one-piece housing.

The filter assembly 70 has a lower base portion 72, which is typically made from silicone or similar soft, pliable material. A filter element 74 is bonded to, and extends upwardly from, the base portion 72. The intake hose (not shown) will be inserted into, and pipe-clamped to, the hose interface 82.

What is unique about these filters 70 are the deflectable tabs 78 extending around the upper periphery of the base portion 72. These tabs 78 are intended to deflect when the user pushes the filter assembly 70 into the housing (not shown). Once the tabs 78 push past the wall of the housing (not shown), they will snap back into their undeflected condition once they are inside of the housing. At that point, the tabs 78 will prevent the filter 70 from being removed from the housing unless it is pryed or pulled out with substantial force. This process can be very awkward because of the tight confines within the engine compartment, and filter replacement can require partial disassembly of the cold air intake system.

The other problem with this design is that there is quite a large gap 80 between the deflectible tabs 78 and the base flange 76. The base flange 76 remains external to the housing (not shown), while the tabs 78 are internal to the housing when the filter 70 is installed. This gap 80 must be left so wide in order that the tabs 78 have enough room to deflect down when the filter 70 is inserted through the hole in the side of the housing. The problem is that once the tabs 78 return to their undeflected condition (shown here), the gap 80 substantially exceeds the wall thickness of the housing. This means that the filter 70 will not seal tightly to the housing, and can even be capable of rattling loosely when the engine is running. This looseness creates air leaks in the system (since the system is under suction), which will allow hot air from the engine compartment into the air intake stream. This partially defeats the purpose and benefit of the cold air intake system.

This invention seeks to cure the air leakage problem in traditional housing-mounted engine air cleaners by creating a quarter-turn twist-lock filter and a housing with a receptacle formed in it that cooperates with the twist-lock filter.

SUMMARY OF THE INVENTION

In light of the aforementioned problems associated with the prior devices and methods, it is an object of the present invention to provide a Twist-interlocking Engine Housing and Air Filter System and Method. The filter assembly should provide unequaled ease of installation and removal, as well as superior sealing between the housing and the filter assembly. For installation, the user should need only to insert the filter into the housing and then give the filter assembly a one-quarter turn or less to lock the filter assembly into the housing. There should be features within the filter base that snap-locks the filter in place to resist inadvertent loosening. Finally, the housing and filter should be designed so that the outer flange of the filter base is recessed into the side of the housing in order to prevent the intrusion of unwanted grime and/or fluids.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a Twist-interlocking Engine Housing and Air Filter System and Method.

Figure 1:
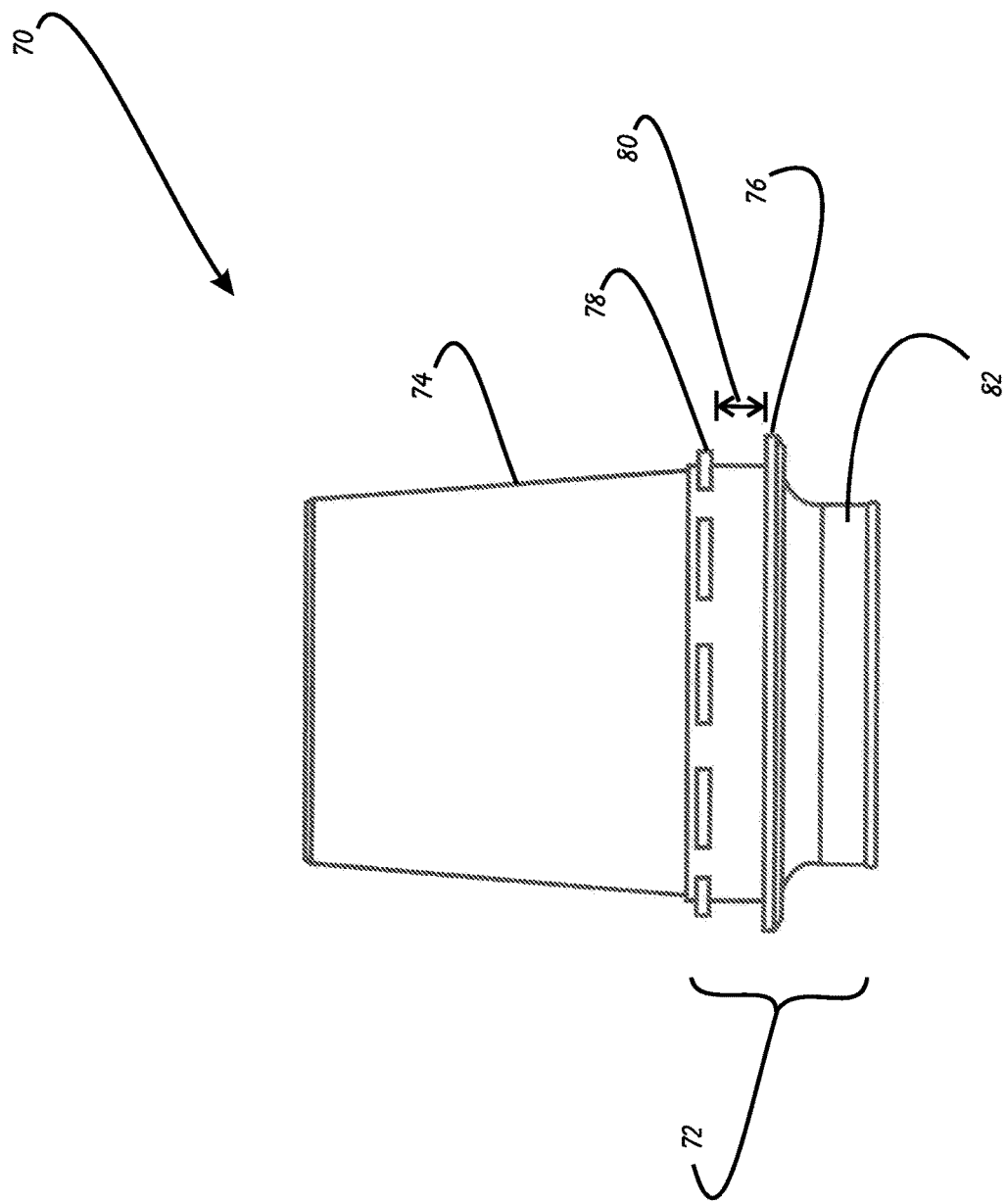
FIG. 1 is a side view of a prior version of a press-in filter assembly.
Figure 2:
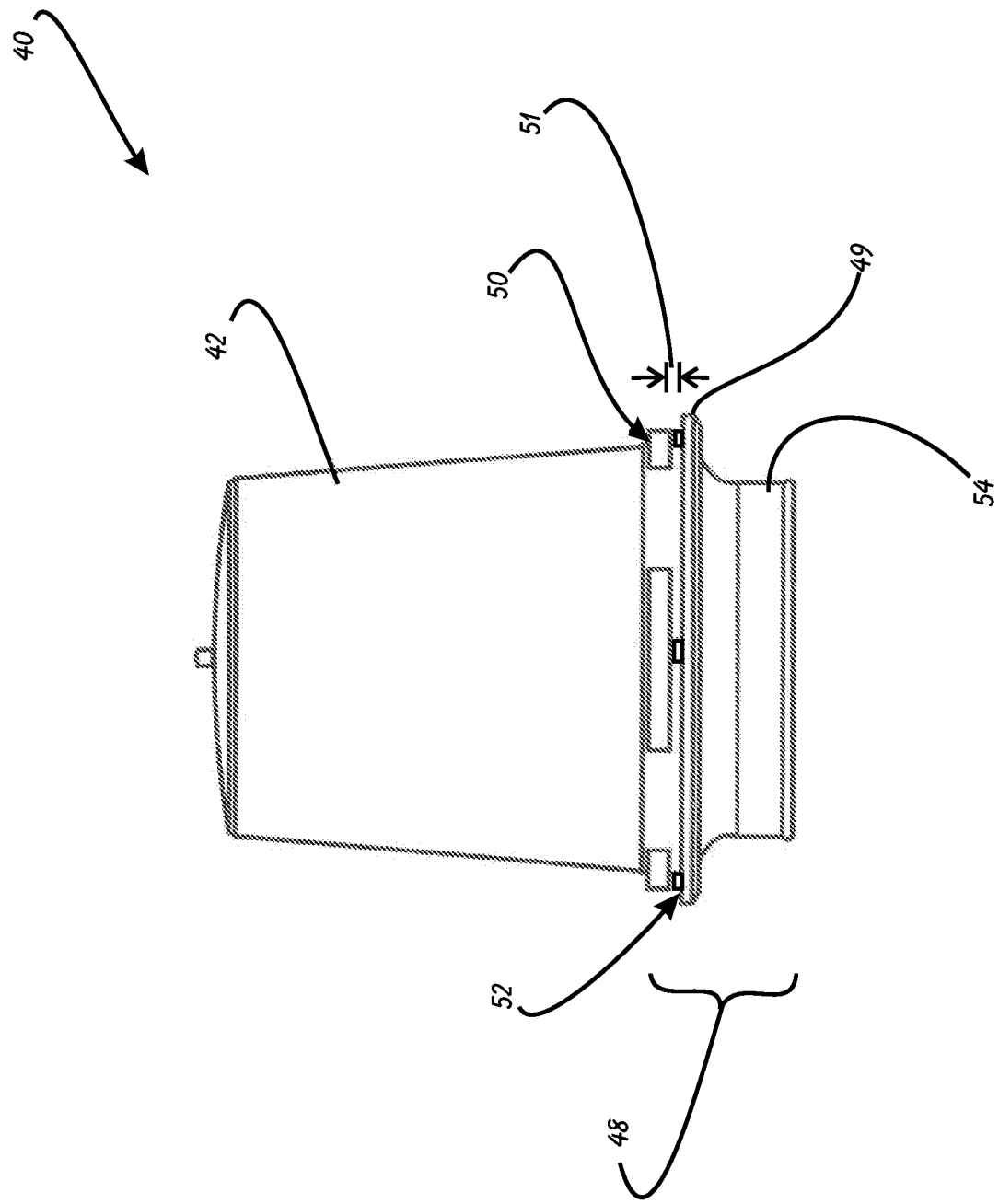
FIG. 2 is a side view of a preferred embodiment of the twist-lock filter assembly of the present invention.

The present invention can best be understood by initial consideration of FIG. 2. FIG. 2 is a side view of a preferred embodiment of the twist-lock filter assembly 40 of the present invention. This assembly 40 cures the two problems with the prior one-piece filter housing/filter combinations by (a) providing a secure, airtight seal between the filter assembly 40 and the housing (not shown), and (b) allowing the user to easily remove the filter assembly 40 by simply twisting the assembly ⅛th of a turn an pulling it out. This can easily be done while the air intake system otherwise remains assembled.

Figure 3:
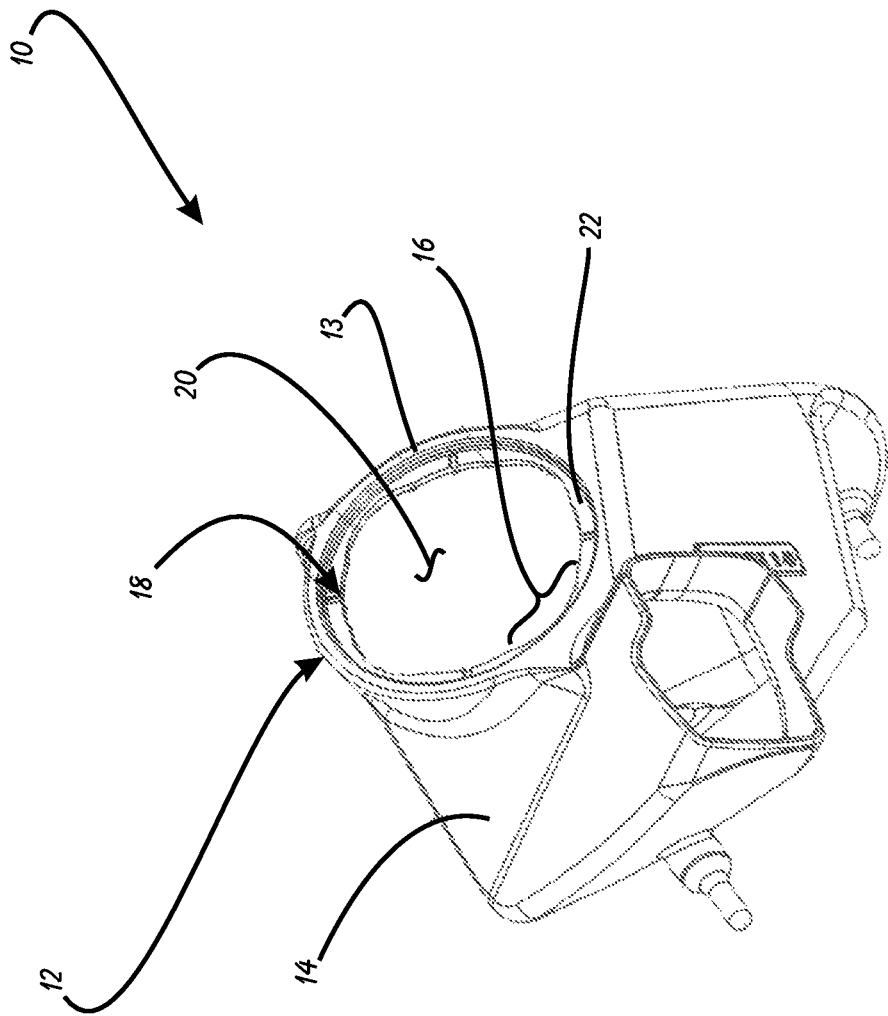
FIG. 3 is a perspective view of a preferred embodiment of the air intake housing for a twist-lock filter of the present invention.
Figure 4:
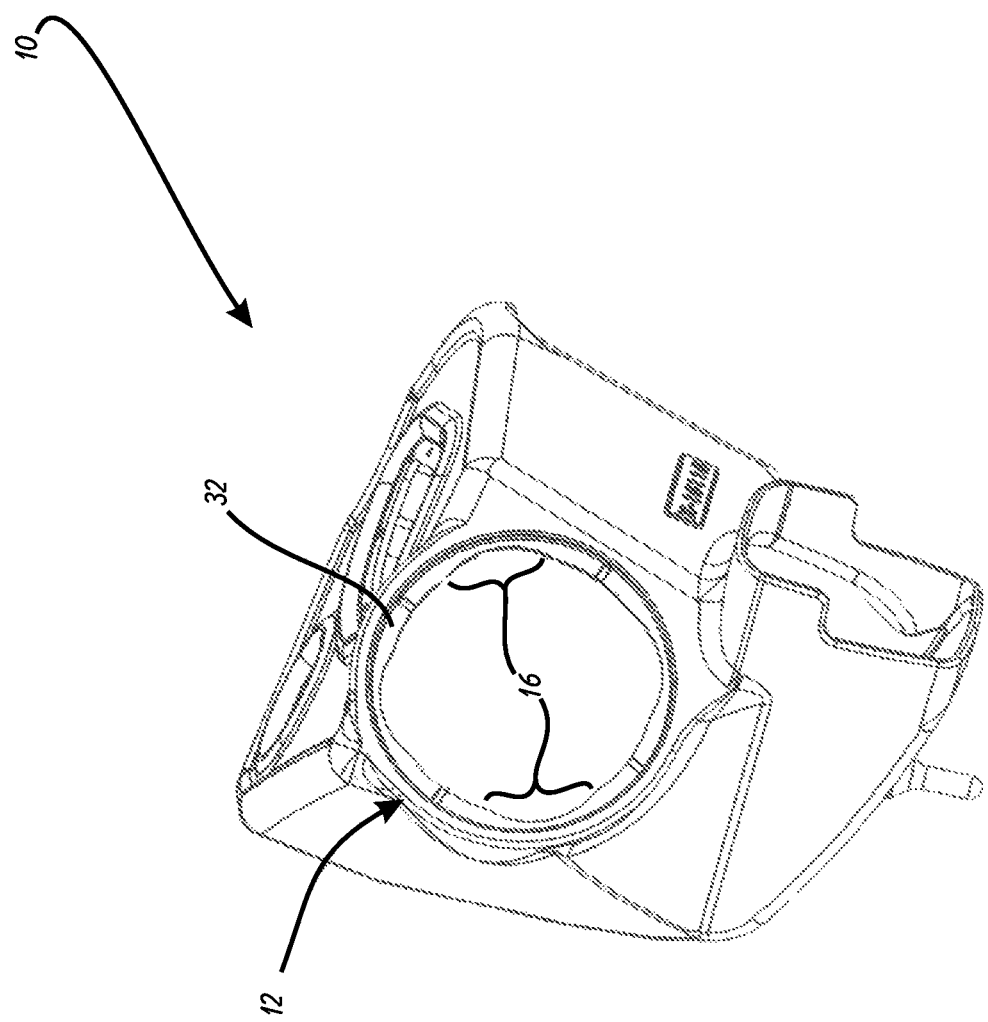
FIG. 4 is another perspective view thereof.
Figure 5:
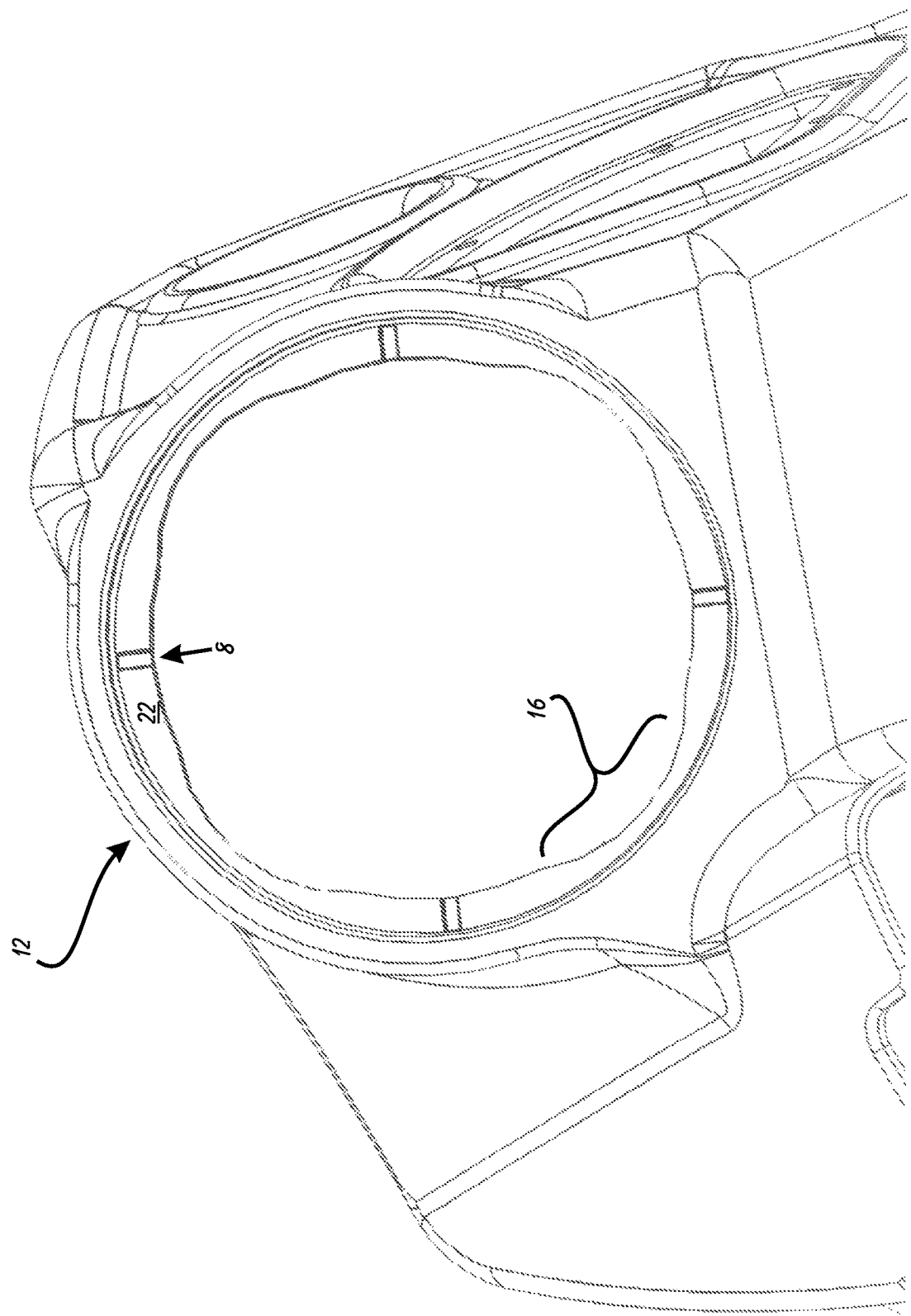
FIG. 5 is a partial view depicting the filter socket area thereof.
Figure 6:
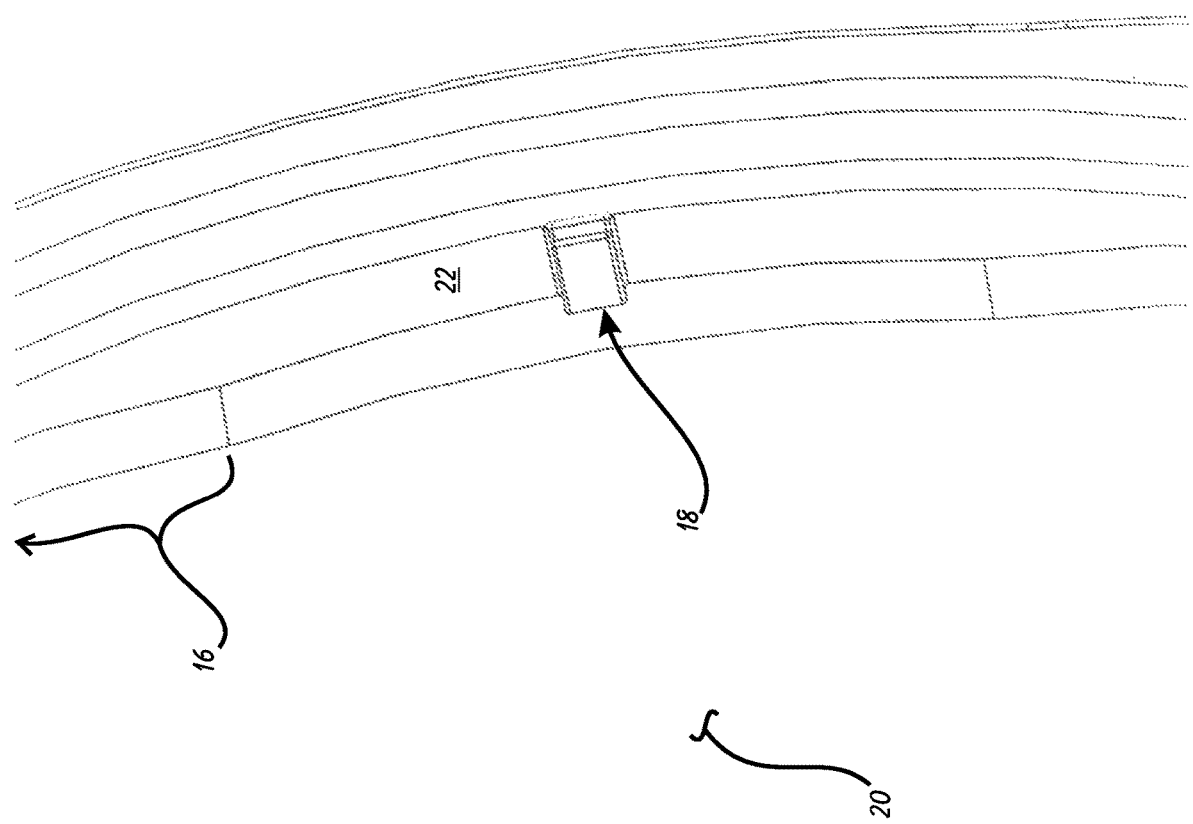
FIG. 6 is a partial view of the peripheral flange thereof.

The improvement to the assembly 40 is located in the base portion 48. Instead of employing several thin deflectable tabs to secure the filter assembly 40 into the housing, this device utilizes thicker, curved (arcuate) tabs 50. In this version, there are four tabs 50 in equal spaced relation around the periphery of the base portion 48. As should be apparent, the housing wall gap 51 between the bottom surface of tabs 50 and the top surface of the base flange 49 is much smaller than the prior filter assemblies [70]. A width of approximately 4 millimeters for the gap 51 has found to be very suitable, whereas the gap [80] of the prior assembly [70] is in excess of 10 millimeters. As will be discussed below, the housing of the present invention includes a wall thickness of approximately 5 millimeters at the point of attachment of the filter assembly 40. This means that there should be a slight interference fit between the filter assembly 40 and the housing—the flexible nature of the silicone material of the base portion 48 will allow this much flex in the arcuate tabs 50, without there being any air gaps at the interface (or rattling). As with the prior filter assembly, a hose will insert into, and be clamped to, the hose interface 54. FIG. 3 introduces the housing the cooperates with this filter assembly 40.

FIG. 3 is a perspective view of a preferred embodiment of the air intake housing 10 for a twist-lock filter [40] of the present invention. The air intake housing 10 is predominantly comprised of the housing 14 (preferably from blow-molded plastic). The filter socket 12 is formed in one side of the housing 14—it is an aperture formed in the wall of the housing 14 (so that the filter assembly [40] will reside in the inner chamber 20 when the filter assembly [40] is locked into the socket 12.

Figure 7:
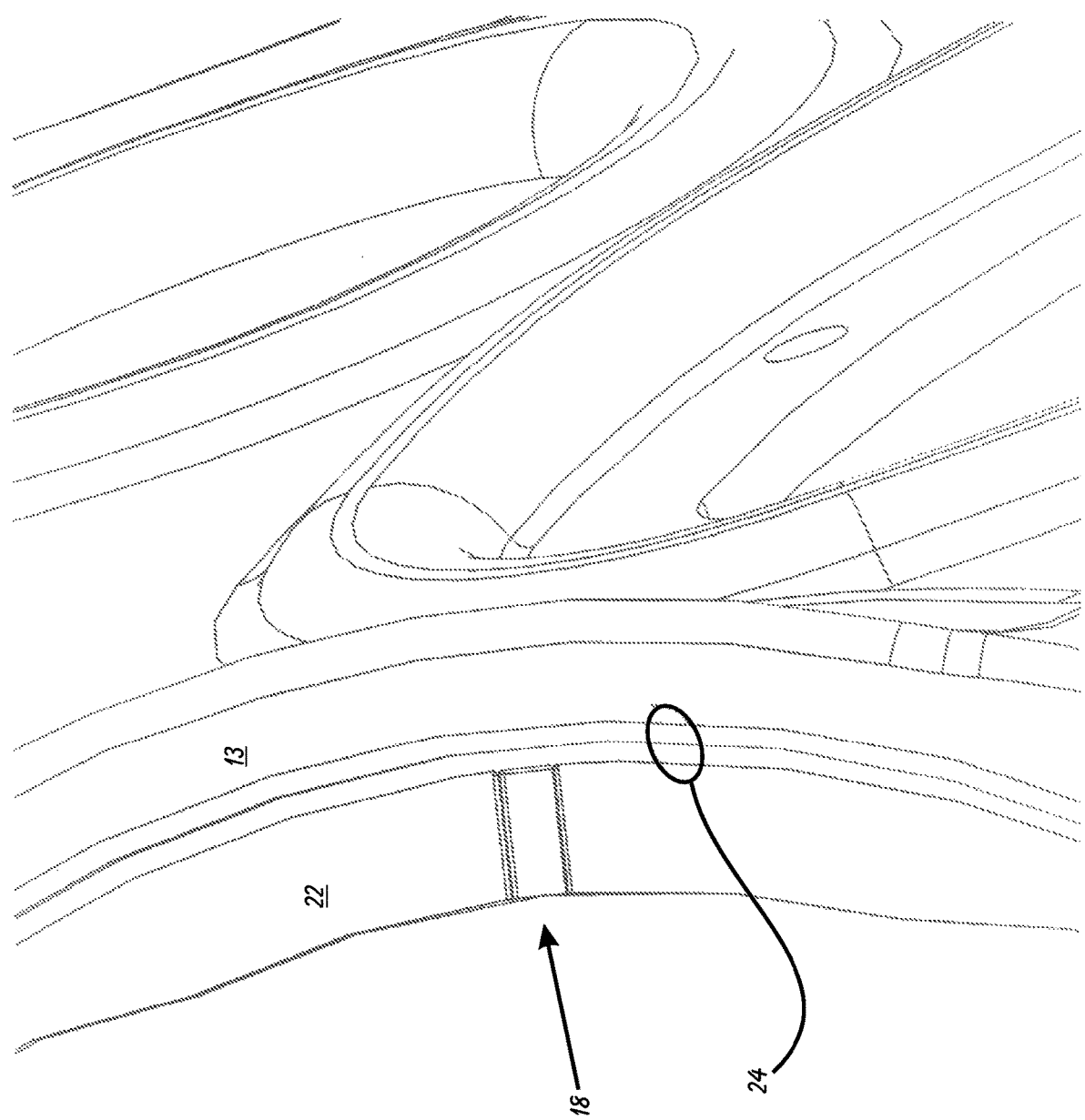
FIG. 7 is a partial front view thereof.

There is a peripheral rim 13 surrounding the opening into the chamber 20, with the rim 13 being the outermost surface of the housing 14. A peripheral flange 22 is recessed below the surface of the rim 13 (creating a sidewall interconnecting the two—see element 24 in FIG. 7). The base flange [49] seals against the face of the peripheral flange 22 when the filter assembly [40] is seated and twist-locked. Because the flange 22 is recessed, the base flange [49] is actually recessed below the surface of the rim 13 (or at least flush with it), which creates a cleaner finished product which resists the intrusion of dirt or liquid to interfere with the sealing surface between the filter assembly [49] and the housing 14.

In this version, four arcuate notches 16 are cut into the inner edge of the flange 22—these are sized and positioned to cooperate with the arcuate tabs [50] so that the tabs [50] will insert into the notches 16. There are also radial notches 18 formed in the face of the peripheral flange 22. Here there are four notches 18—each is centered between each arcuate notch 16. These notches 18 provide for a positive "click" between the filter assembly [40] and the flange 22 when the filter assembly [40] is rotated until it is in the locked position. As is depicted in FIGS. 8 and 9, there are radial tabs extending upwardly from the base flange under each arcuate tab [50] that are formed to fit into these notches 18.

FIGS. 4, 5, 6 and 7 are additional views of the filter socket region of the housing 14—they are provided to insure that even the smaller features comprising the filter socket 12 are clear.

Figure 8:
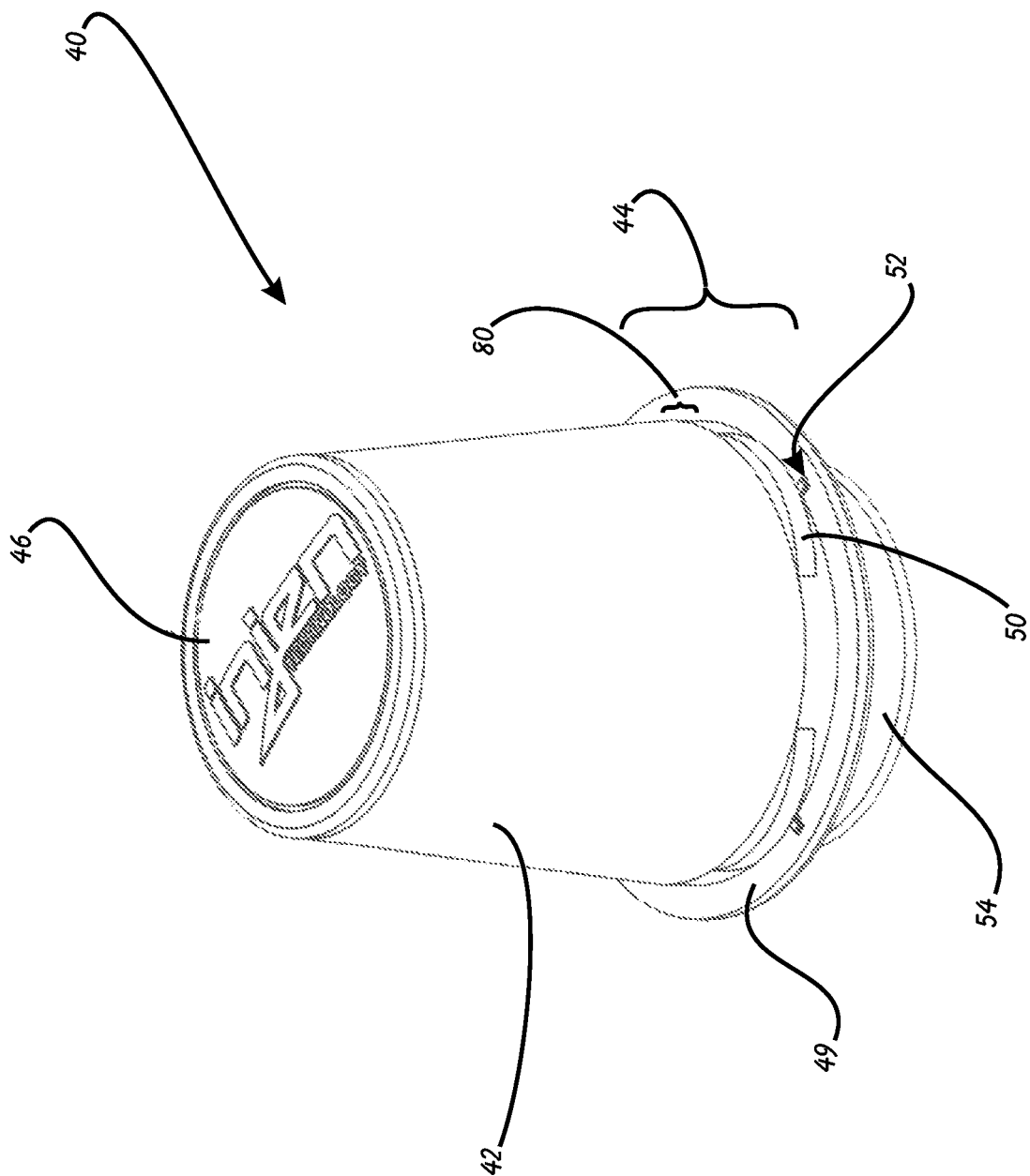
FIG. 8 is a perspective view of the filter assembly of FIG. 2.
Figure 9:
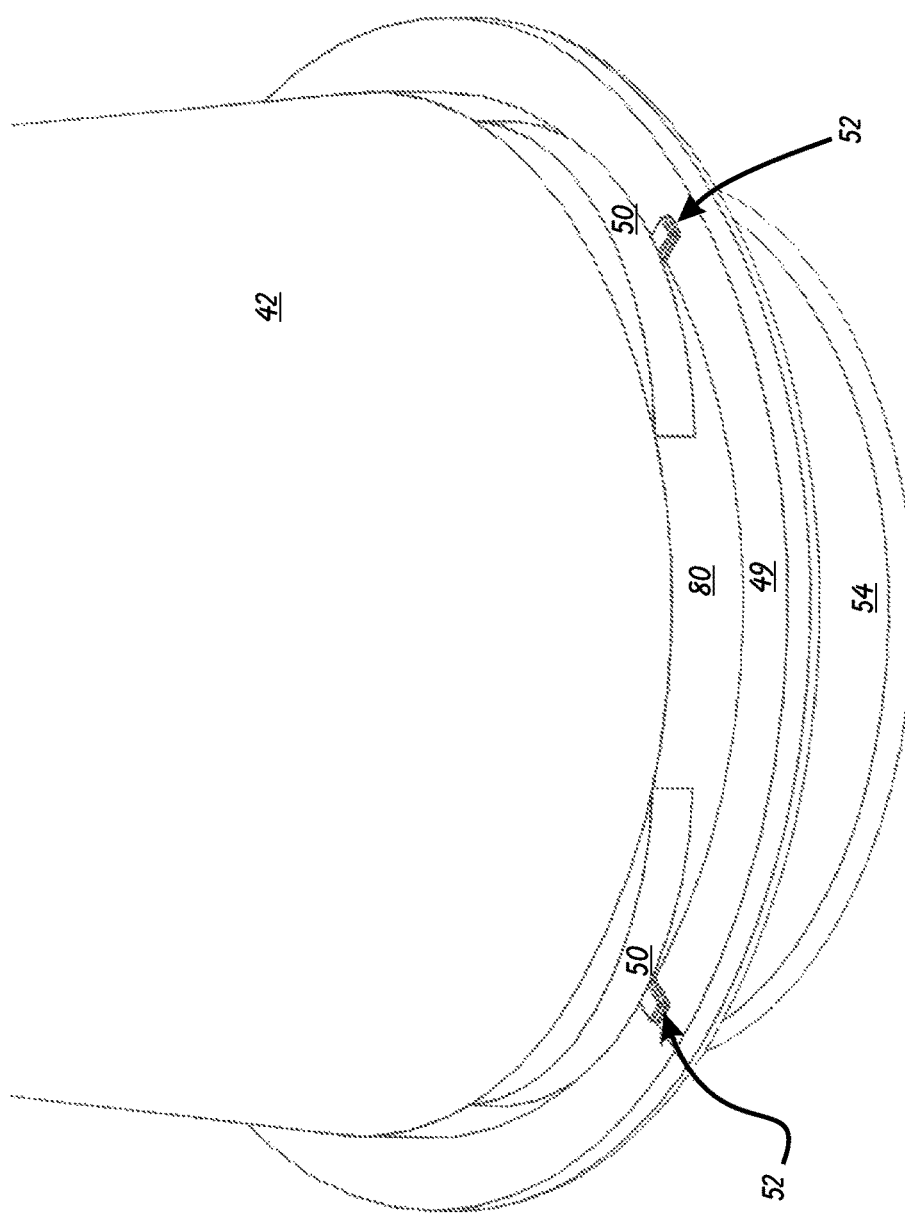
FIG. 9 is a partial perspective view of the base area thereof.

FIG. 8 is a perspective view of the filter assembly 40 of FIG. 2. The arcuate tabs 50 taper into the wall of the base portion 44 so that they can be smoothly inserted into the arcuate notches [16], and then the assembly 40 can be twisted without the edges of the tabs 50 snagging so that the rotation is smooth and unobstructed. As can be seen, the radius that defines the arc of the tabs 50 is much smaller than the radius that defines the outer periphery of the base flange 48 or the filter engagement portion 80 of the assembly 40. In fact, a tab 50 radius of 50% or less than the radius of the filter engagement portion 80 has been seen to be suitable.

As can be seen here, the radial tabs 52 extend radially outward from the center periphery of the housing-facing face of the base flange 48. As discussed above, these tabs 52 are formed so that they will fit snugly into the radial notches 18 formed in the peripheral flange [22] of the housing [14]. Finally, the closed cap portion 46 to the filter element 42 can be seen here—other configurations are also possible.

Figure 10:
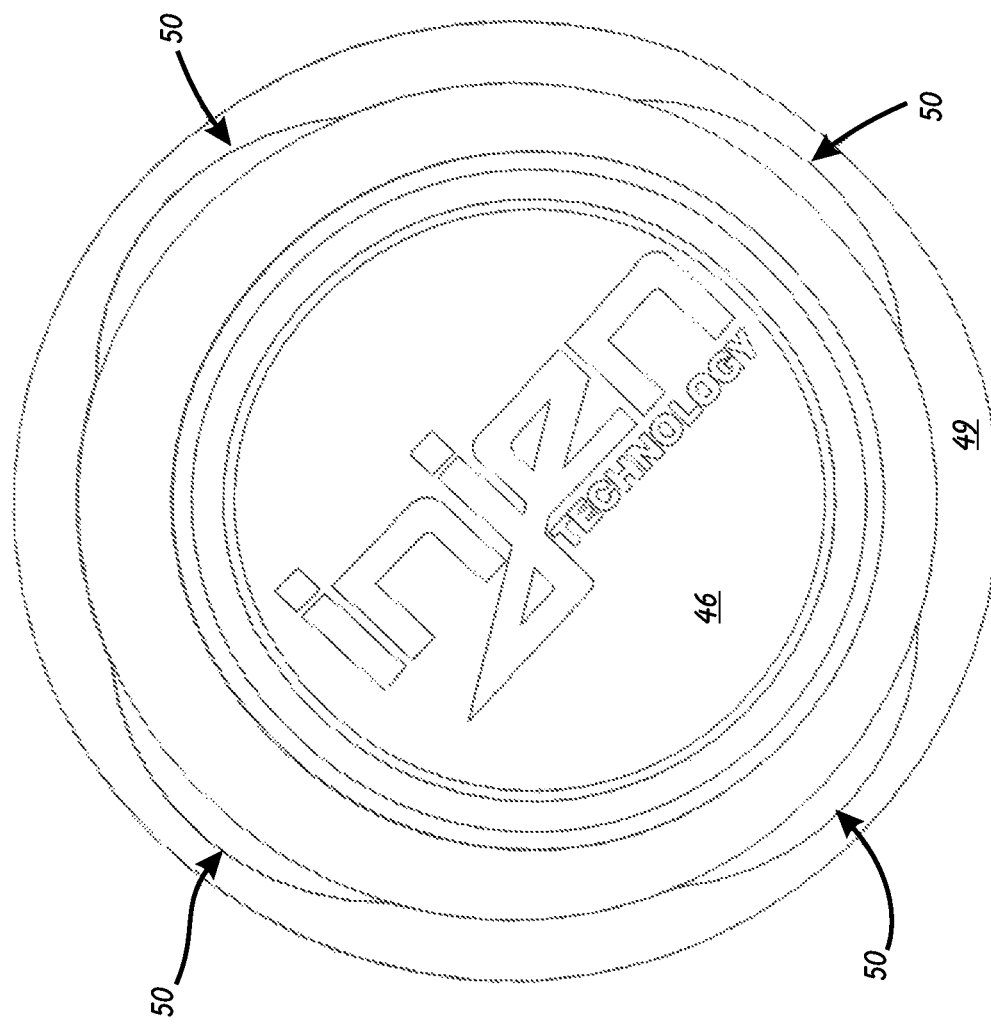
FIG. 10 is a top view of the filter assembly thereof.

FIGS. 9 and 10 are additional views of the base portion region of the filter assembly 40—they are provided to illuminate the details of, and relationships between, the arcuate tabs 50 and the radial tabs 50.

Figure 11:
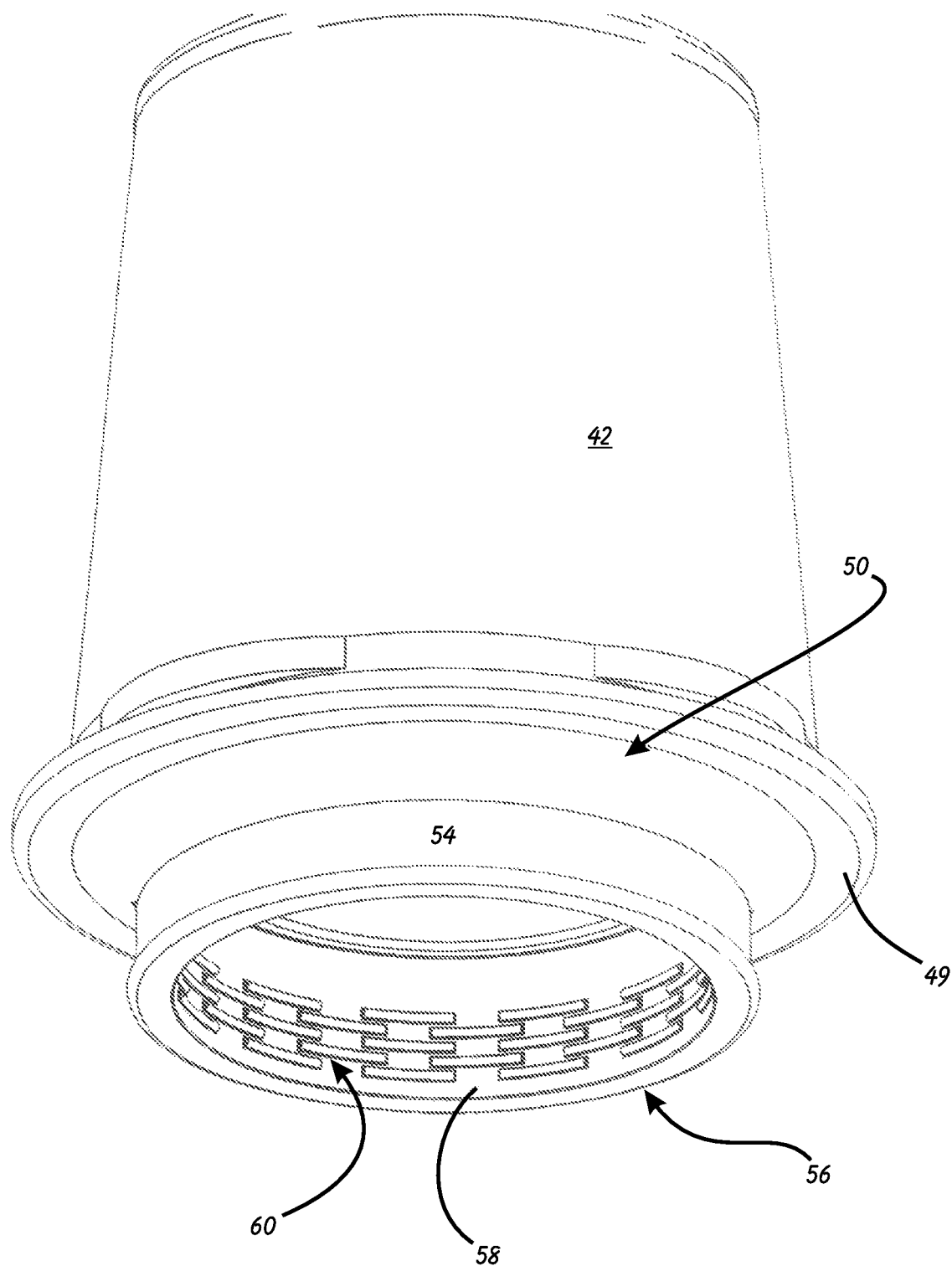
FIG. 11 is a bottom perspective view thereof.

If we finally turn to FIG. 11, we can examine yet another unique feature of the instant design. FIG. 11 is a bottom perspective view of the hose interface 54 area of the filter assembly 40. As discussed above, the hose interface 54 is configured to accept an intake hose within it. To that end, an intake hose throat 56 is formed in the hose interface 54 that defines an inner wall 58. There are a plurality of staggered ridges 60 protruding into the throat 56. These ridges 60 assist in the grasping force between the hose interface 54 and the intake hose (i.e. when the hose clamp is tightened around the hose interface 54). The prior filters do not use staggered ridges 60, but rather use continuous ring-shaped ridges that completely encircle the throat 56. The use of staggered (non-continuous) ridges 60 allows the ridges 60 to compress when the hose clamp is tightened without causing ripples in the hose interface 54. The improved compressibility comes from the spacing between the ridges 60 in reach row—this spacing can compress without compressing the ridges 60 themselves.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A twist-lock filter assembly for internal combustion engines, comprising:
   a base portion comprising:
      a base flange defined by a top surface and at least two radial tabs protruding upward from said top surface in relative radial spaced relation;
      a housing wall extending upwardly from said base flange; and at least two arcuate tabs extending outwardly from said housing wall in spaced relation to said base flange and each said radial tab is juxtaposed beneath one said arcuate tab; and a filter element extending from said base portion.

2. The filter assembly of claim 1, wherein said housing wall defines a generally circular profile that is defined by a first circular radius, and said arcuate tabs define arcs of generally circular profile that are defined by a second circular radius, wherein said second circular radius is less than said first circular radius.

3. The filter assembly of claim 2, wherein said second circular radius is less than or equal to one-half of said first circular radius.

4. The filter assembly of claim 1, wherein said arcuate tabs are spaced from a top surface defined by said base flange by a housing wall gap of less than 10 millimeters.

5. The filter assembly of claim 1, further defined by a hose interface portion extending from said base portion opposite from said housing wall, said hose interface portion defined by an inner wall defined by a plurality of staggered ridges encircling its periphery.

6. The filter assembly of claim 5, wherein said staggered ridges are defined by a first series of ridges in relative spaced relation defined by ridges separated by gaps therebetween, and a second series of ridges in relative spaced relation defined by ridges separated by gaps, wherein said gaps between said first series of ridges is radially offset from said gaps between said second series of ridges.

7. The filter assembly of claim 6, further comprising a third series of ridges in relative spaced relation defined by ridges separated by gaps therebetween, said gaps between said third series of ridges is radially offset said gaps between said second series of ridges.

8. The filter assembly of claim 1, comprising four said arcuate tabs in equal relative spaced relation around said housing wall, and further comprising four said radial tabs, with each said radial tab juxtaposed by one said arcuate tab.

9. An air intake system for an internal combustion engine, comprising:
an intake housing defining an outer housing wall enclosing an inner chamber, said outer housing wall defined by a filter socket formed therethrough into said inner chamber, said filter socket comprising an upper rim around the periphery of said filter socket and a peripheral flange around the periphery of said filter socket in spaced relation to said upper rim, said peripheral flange defined by two or more arcuate notches in relative spaced relation around the periphery of said flange said peripheral flange defines a top surface having two or more radial notches formed therein; and
a twist-lock filter assembly configured for insertion into said filter socket, said filter assembly, comprising:
a base portion comprising:
a base flange defined by a top surface and at least two radial tabs protruding upward from said top surface in relative spaced relation, wherein said radial tabs and said radial notches are cooperatively located such that said radial tabs align with said radial notches when said base flange is inserted into said filter socket and twisted radially for less than a ½ rotation;
a housing wall extending upwardly from said base flange; and
at least two arcuate tabs extending outwardly from said housing wall in spaced relation to said base flange, said arcuate tabs cooperatively aligned with said arcuate notches such that said tabs insert into said inner chamber through said arcuate notches when said filter assembly is inserted into said filter socket; and
a filter element extending from said base portion.

10. The air intake system of claim 9, wherein said housing wall of said filter assembly defines a generally circular profile that is defined by a first circular radius, and said arcuate tabs define arcs of generally circular profile that are defined by a second circular radius, wherein said second circular radius is less than said first circular radius.

11. The air intake system of claim 10, wherein said second circular radius of said filter assembly is less than or equal to one-half of said first circular radius.

12. The filter assembly of said air intake system of claim 9, wherein said arcuate tabs are spaced from a top surface defined by said base flange by a housing wall gap of less than 10 millimeters.

13. The filter assembly of said air intake system of claim 12, further defined by a hose interface portion extending from said base portion opposite from said housing wall, said hose interface portion defined by an inner wall defined by a plurality of staggered ridges encircling its periphery.

14. The filter assembly of said air intake system of claim 13, wherein said staggered ridges are defined by a first series of ridges in relative spaced relation defined by ridges separated by gaps therebetween, and a second series of ridges in relative spaced relation defined by ridges separated by gaps, wherein said gaps between said first series of ridges is radially offset from said gaps between said second series of ridges.

15. The filter assembly of said air intake system of claim 14, wherein each said radial tab is juxtaposed beneath one said arcuate tab.

16. The filter assembly of claim 15, further comprising a third series of ridges in relative spaced relation defined by ridges separated by gaps therebetween, said gaps between said third series of ridges is radially offset said gaps between said second series of ridges.

17. The filter assembly of said air intake system of claim 16, comprising four said arcuate tabs in equal relative spaced relation around said housing wall, and further comprising four said radial tabs, with each said radial tab juxtaposed by one said arcuate tab.

\* \* \* \* \*